United States Patent
Brosten et al.

(10) Patent No.: US 10,081,767 B2
(45) Date of Patent: Sep. 25, 2018

(54) FEED NOZZLE ASSEMBLY FOR A CATALYTIC CRACKING REACTOR

(71) Applicant: SHELL OIL COMPANY, Houston, TX (US)

(72) Inventors: David Jon Brosten, Anacortes, WA (US); Ye-Mon Chen, Sugar Land, TX (US)

(73) Assignee: SHELL OIL COMPANY, Houton, TX (US)

(*) Notice: Subject to any disclaimer, the term of this patent is extended or adjusted under 35 U.S.C. 154(b) by 596 days.

(21) Appl. No.: 14/437,844

(22) PCT Filed: Oct. 22, 2013

(86) PCT No.: PCT/EP2013/072079
§ 371 (c)(1),
(2) Date: Apr. 23, 2015

(87) PCT Pub. No.: WO2014/064109
PCT Pub. Date: May 1, 2014

(65) Prior Publication Data
US 2015/0291885 A1 Oct. 15, 2015

Related U.S. Application Data

(60) Provisional application No. 61/718,240, filed on Oct. 25, 2012.

(51) Int. Cl.
*B01J 4/00* (2006.01)
*B01J 19/26* (2006.01)
(Continued)

(52) U.S. Cl.
CPC .......... *C10G 1/045* (2013.01); *B01F 3/04063* (2013.01); *B01F 5/0456* (2013.01);
(Continued)

(58) Field of Classification Search
CPC ............. B01J 8/085; B01J 2208/00902; B01F 3/04063; B01F 2005/0051; B05B 7/04;
(Continued)

(56) References Cited

U.S. PATENT DOCUMENTS 3,696,168 A * 10/1972 Vanderveen ............. B01J 4/001
422/215
5,934,566 A * 8/1999 Kanno ................. B01F 3/04049
134/102.1
(Continued)

FOREIGN PATENT DOCUMENTS

EP 0593171 4/1994
EP 2325281 5/2011
(Continued)

OTHER PUBLICATIONS

Fogassy G., et al.; "Biomass derived feedstock co-processing with vacuum gas oil for second-generation fuel procutions in FCC units"; Applied Catalysis B: Environmental; vol. 96, No. 3-4; pp. 476-485; Jun. 7, 2010.

Primary Examiner — Jennifer A Leung

(57) ABSTRACT

Reactor vessel and a feed nozzle assembly for feeding a gas and a liquid into such reactor vessel. The feed nozzle assembly comprises an outer tube supplying a first liquid feed, such as oil, an inner tube supplying a dispersion gas, such as steam, a third tube supplying a second liquid feed, such as biomass, and a nozzle end. A catalytic cracking process wherein two or more hydrocarbon liquids are jointly dispersed into a dispersion gas and jetted via the same feed nozzle assembly into a catalytic cracking reactor.

11 Claims, 1 Drawing Sheet

(51) Int. Cl.
| | |
|---|---|
| *B01F 3/04* | (2006.01) |
| *B05B 7/04* | (2006.01) |
| *C10G 1/04* | (2006.01) |
| *B01F 5/04* | (2006.01) |
| *B01J 8/18* | (2006.01) |
| *B01J 8/38* | (2006.01) |
| *C10G 3/00* | (2006.01) |
| *C10G 11/18* | (2006.01) |
| *B01J 8/00* | (2006.01) |
| *B01J 8/24* | (2006.01) |
| *B05B 7/06* | (2006.01) |

(52) U.S. Cl.
CPC ............... *B01J 4/002* (2013.01); *B01J 8/004* (2013.01); *B01J 8/1818* (2013.01); *B01J 8/24* (2013.01); *B01J 8/388* (2013.01); *B01J 19/26* (2013.01); *B05B 7/04* (2013.01); *B05B 7/0491* (2013.01); *B05B 7/065* (2013.01); *C10G 3/57* (2013.01); *C10G 11/18* (2013.01); *B01F 3/0446* (2013.01); *B01J 2208/00902* (2013.01); *B05B 7/0433* (2013.01); *C10G 2300/1011* (2013.01); *Y02P 30/20* (2015.11)

(58) Field of Classification Search
CPC ... B05B 7/0416; B05B 7/0491; B05B 7/0483; B05B 7/0433
See application file for complete search history.

(56) References Cited

U.S. PATENT DOCUMENTS

| | | |
|---|---|---|
| 6,093,310 A | 7/2000 | Swan |
| 2001/0042703 A1 | 11/2001 | Ito et al. |
| 2002/0185552 A1 | 12/2002 | Adamson et al. |

FOREIGN PATENT DOCUMENTS

| | | |
|---|---|---|
| WO | 2012041782 | 4/2012 |
| WO | 2012062924 | 5/2012 |

\* cited by examiner

FEED NOZZLE ASSEMBLY FOR A CATALYTIC CRACKING REACTOR

PRIORITY CLAIM

The present application is the National Stage (§ 371) of International Application No. PCT/EP2013/072079, filed Oct. 22, 2013, which claims priority from U.S. Provisional Application No. 61/718,240, filed Oct. 25, 2012 incorporated herein by reference.

The invention relates to a feed nozzle assembly for feeding a gas and a liquid into a reactor vessel, particularly for feeding a dispersion gas, such as steam, and a liquid feed into a catalytic cracking reactor.

In fluidized catalytic cracking units and similar processes feed nozzle assemblies can be used for feeding heavy petroleum fractions with a dispersion gas to the reactor, generally a riser reactor where the hydrocarbon feed is contacted with regenerated particulate solid catalyst. Large chain hydrocarbon molecules found in crude oil are cracked into smaller and more valuable commercial products such as gasoline and diesel range hydrocarbons with the help of a cracking catalyst. The catalyst selectively aids desirable cracking reactions to mainly produce desired hydrocarbon products.

An example of a feed nozzle assembly is disclosed in WO 2012/041782. This feed nozzle comprises an inner tube defining a steam conduit and an outer tube coaxially arranged around the inner tube to define an annular hydrocarbon conduit. Such feed nozzle assemblies are typically used as the main injection point for a liquid hydrocarbon feed into the reactor riser.

Renewable energy sources, such as biomass, are becoming increasingly important as an alternative for crude oil. Catalytic cracking processes can be used to produce hydrocarbon fuels from biomass. Good results are achieved if biomass is cracked jointly with a feed of crude oil or other type of liquid hydrocarbon main feed. However, adding a second or further feed nozzle to a lift pot assembly or riser of a catalytic cracking reactor requires structural and costly modifications. Mixing biomass feed with a hydrocarbon feed upstream the feed nozzles is not a workable alternative since biomass typically includes particulate material that may result in plugging of the feeding lines and valves if it is fed to the riser reactor pre-mixed with oil. Moreover, biomass generally may contain components that could cause fouling in hydrocarbon feed lines. In addition, biomass might decompose if it is exposed to hydrocarbon feed temperature for long time.

Therefore, it is an object of the present invention to enable combined cracking of different hydrocarbon feeds, such as crude oil and biomass, without requiring costly modifications of the lift pot assembly, the riser or other parts of the cracking reactor.

To this end, a feed nozzle assembly is disclosed for feeding a gas and a liquid into a reactor vessel. The feed nozzle assembly comprises:
- an outer tube extending between a liquid feed inlet and a nozzle outlet;
- an inner tube with a downstream section having a gas outlet. The downstream section of the inner tube is arranged within the outer tube to define an annular conduit. The nozzle outlet of the outer tube is downstream in line with the gas outlet of the inner tube.
- a third tube with one end connected to a second liquid feed inlet and an opposite end having an outlet. The outlet is positioned within the annular conduit upstream the gas outlet.

The main hydrocarbon feed, typically crude oil, can be fed to the reactor via the annular conduit where it joins the flow of the second hydrocarbon feed, e.g., biomass, supplied via the third tube. The combined feed can then be dispersed by the gas feed and atomized into the reactor. The biomass is injected into the hydrocarbon feed at the nozzle. This ensures short contact time between the biomass feed and the hydrocarbon feed.

The third tube can also be used for the supply of any other type of liquid, such as sour water. Sour water is acidic refinery process water, e.g., process water from a fluid catalytic cracking (FCC) process, containing hydrogen sulphide among other radicals. Injection of sour water into the riser allows manipulating the energy balance of a unit in the absence of a catalyst cooler and helps increasing catalyst circulation rate by reducing the pressure drop across the riser reactor.

Other liquids or gases can also be supplied via the third tube. Optionally, further additional tubes can be provided for the supply of further feed types, if so desired.

Optionally, the third tube is also connected to a purging gas supply. In case the biomass feed is interrupted the purging gas flow keeps the biomass feed tube and its outlet clear of debris and avoids plugging. The purging gas can for instance be the same gas as the used dispersion gas, e.g., steam.

In a specific embodiment the third tube may have a downstream section arranged parallel, e.g., coaxial, to the inner tube. For instance, the third tube can be part of an array of parallel tube sections in the annular conduit, such as muffler tubes as proposed in WO 2012/041782. Muffler tubes reduce vibration of the inner tube and can for example be held in place by an annular plate perpendicular to the inner tube axis and having openings accommodating the third tube and the muffler tubes respectively. The number of muffler tubes, including the third tube of the feed nozzle assembly, may for example be from 3 to 15. The tubes can be evenly distributed over the cross section of the annular conduit.

To connect the third tube to the second feed supply the third tube may be provided with a section, such as a tube bend, crossing the wall of the outer tube.

The third tube can for example be operatively connected to a supply of a hydrocarbon feed, such as biomass preferably fluid biomass. Suitable biomass feed may include a fluid biomass material derived from for instance a lignocellulosic material such as agriculture waste, forest residue, wood chips, straw, chaff, grain, grasses, corn, corn husks, weeds, aquatic plants, hay and any cellulose containing biological material or material of biological origin, also including municipal waste. A suitable biomass feed may for example be a pyrolysis oil, derived from a lignocellulosic material as described above. Such pyrolysis oil can be obtained by pyrolysing said lignocellulosic material and optionally wholly or partly hydrodeoxygenating the pyrolysis product obtained. An example of a pyrolysis process of a lignocellulosic material and an optional process for partly hydrodeoxygenating the obtained pyrolysis product is described in EP-A-2325281.

To use the feed nozzle assembly with a fluid catalytic cracking reactor, the inner tube can for example be operatively connected to a supply of a dispersion gas, while the outer tube is operatively connected to a supply of a liquid hydrocarbon fraction. The dispersion gas can for example be or comprise steam and/or nitrogen and/or any other suitable dispersion gas. The liquid hydrocarbon fraction can for instance be crude oil.

Accordingly, the feed nozzle assembly is particularly useful for a catalytic cracking reactor, in particular an FCC reactor. Such a reactor may comprise one or more of such feed nozzle assemblies, for instance as side entry feed nozzle assemblies. Typically, such reactors comprise a riser where atomized droplets of the crude oil fraction are contacted with solid particulates of a regenerated oil cracking catalyst. The lower end of the riser may be connected to a catalyst lift pot or a J-bent configuration where one or more feed nozzle assemblies can be arranged.

The feed nozzle assembly can be used with a catalytic cracking process wherein a liquid hydrocarbon main fraction, such as crude oil or a heavy petroleum, is dispersed into a dispersion gas, in particular steam, and jetted via one or more feed nozzle assemblies into a catalytic cracking reactor. One or more further hydrocarbon fractions, such as biomass, and/or sour water can be fed to the same feed nozzle assembly to be jointly dispersed with the hydrocarbon main fraction.

The invention will now be described by way of example in more detail with reference to the accompanying drawings, wherein.

Figure 1:
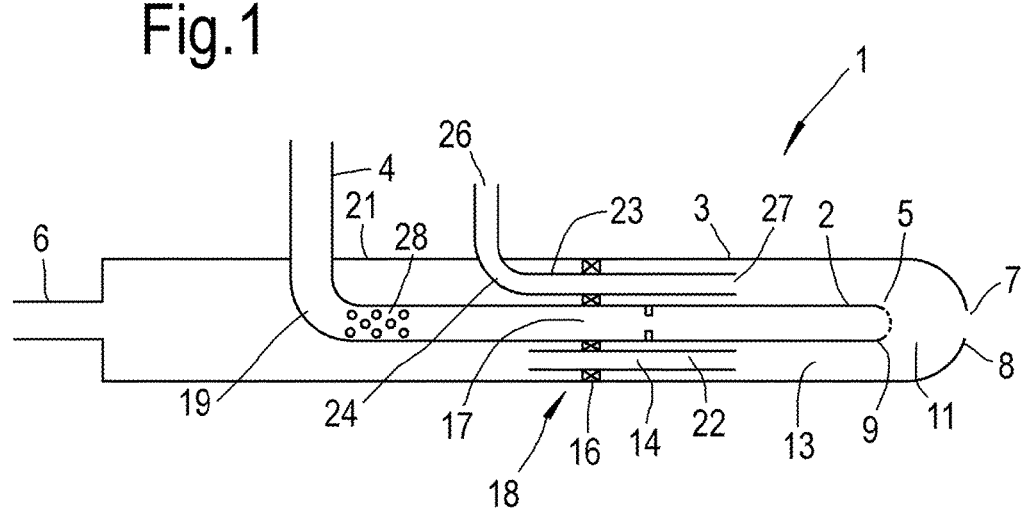
FIG. 1 shows a longitudinal section of the feed nozzle assembly of the invention.

FIG. 1 shows a feed nozzle assembly 1 for feeding steam, crude oil and biomass into a catalytic cracking reactor. The feed nozzle assembly 1 comprises a cylindrical inner tube 2 and a cylindrical outer tube 3. The inner tube 2 defines a gas conduit and extends between a dispersion gas inlet 4 and a dispersion gas outlet with one or more orifices 5. The outer tube 3 extends between a liquid inlet 6 and a nozzle outlet 7 aligned with the one or more gas orifices 5 of the inner tube 2. The one or more gas orifices 5 are arranged upstream the nozzle outlet 7.

The outer end of the outer tube 3 is bordered by a semispherical end wall 8 comprising the nozzle outlet 7. Similarly, the outer end of the inner tube 2 is bordered by a semispherical end wall 9 comprising the dispersion gas orifice 5. The two semispherical end walls 8, 9 define a chamber 11.

The inner tube 2 is coaxially arranged within the outer tube 3 to define an annular liquid conduit 13. An array of equidistantly arranged parallel tubes 14 is positioned within the annular conduit 13. The tubes 14 are fixed in an annular plate 16 extending perpendicularly to the longitudinal axis of the inner and outer tubes 2, 3. The annular plate 16 comprises a central opening 17 holding the inner tube 2 and a circular array of openings 18 holding the tubes 14.

The inner tube 2 has an upstream end connected via a tube bend 19 to the radially extending dispersion gas inlet 4. The tube bend 19 crosses the wall 21 of the outer tube 3. Such a radial side-entrance of the dispersion gas inlet 4 into the feed nozzle assembly 1 allows better access to the inside of the feed nozzle assembly 1. In an alternative embodiment, the liquid inlet 6 can be arranged radially while the dispersion gas inlet 4 is coaxially in line with the nozzle.

The tubes 14 include muffler tubes 22 allowing passage of the flow of liquid hydrocarbon fraction through the annular conduit 13, and at least one biomass tube 23 connected by a tube bend 24 to a radially extending inlet 26 for biomass.

The tube bend 24 crosses the wall 21 of the outer tube 3. The biomass tube 23 has an outlet 27 within the annular conduit 13 upstream the outlets 5, 7.

The nozzle outlet 7 can comprise one or more openings or orifices of any suitable outline, for instance an elongated slit. The steam outlet 5 can for instance be provided with one or more rows of orifices or openings, more specifically of from 1 to 8 rows or from 1 to 6 rows.

The inner tube 2 comprises purging orifices 28. These purging orifices 28 ensure that part of the dispersion gas flows through the annular conduit 13 in case the supply of hydrocarbon liquid stops for example in case of emergency. In order to make maximum use of the dispersion gas added, the purging orifices 28 can be located in the upstream half of the inner tube 2 located inside the outer tube 3.

Figure 2:
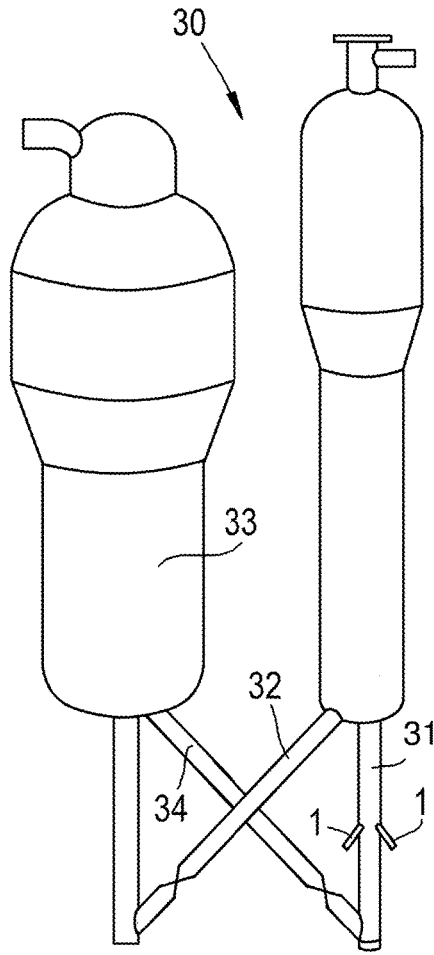
FIG. 2 shows schematically a fluid catalytic cracking reactor comprising the feed nozzle of FIG. 1.

FIG. 2 shows a schematic representation of a fluidized catalytic cracking reactor 30 comprising the feed nozzle assembly 1 of FIG. 1. The reactor 30 comprises a riser reactor 31. In the riser reactor 31 an atomized liquid feed is contacted with a particulate solid catalyst catalyzing the desired cracking reactions. Used catalyst is fed via a line 32 to a regenerator 33, where the catalyst is regenerated. The regenerated catalyst is returned via a return line 34 to the riser reactor 31 for re-use. Feed nozzle assemblies 1 of the type as shown in FIG. 1 are mounted as side entry feed nozzles on the wall of the riser reactor 31. The feed nozzle assemblies 1 are directed upwardly under an acute angle with the vertical riser reactor wall. In order to provide an even distribution of the oil over the riser, multiple side entry feed nozzles can be located on the riser circumference at the same or different levels. A further advantage of placing the nozzles around the riser circumference is that this tends to off-set the tendency of the catalyst to migrate to the riser walls.

During normal operation of the feed nozzle assembly 1 dispersion gas, generally steam, is supplied from the dispersion gas inlet 4 through the inner tube 2 while hydrocarbon feed, generally crude oil, is supplied via the inlet 6 to the annular liquid conduit 13. A feed of a second hydrocarbon liquid, such as biomass, is supplied via the third tube 23. Steam, exiting the steam orifice 5 jointly disperses the crude oil with the biomass. The joint hydrocarbon feed is atomized at the nozzle outlet 7 into the fluid catalytic cracking reactor.

In the riser 31 of the fluid catalytic cracking reactor the hydrocarbon feed is vaporized and cracked into smaller molecules under the action of a regenerated hot catalyst. The catalyst may for example have a temperature of at least 600° C. Cracked product vapours are separated from spent catalyst with the help of cyclones. The hydrocarbon feed generally is heated, preferably to a temperature of from 150 to 300° C., before being fed to the feed nozzle and the riser reactor.

That which is claimed is:

1. A feed nozzle assembly for feeding a gas and a liquid into a reactor vessel which feed nozzle assembly comprises:
an outer tube extending between a first liquid feed inlet and a nozzle outlet;
an inner tube comprising purging orifices in an upstream half of the inner tube and with a downstream section having a gas outlet, the downstream section of the inner tube being arranged within the outer tube to define an annular conduit, wherein the nozzle outlet of the outer tube is downstream in line with the gas outlet of the inner tube;

a third tube with one end connected to a second liquid feed inlet and an opposite end with an outlet, at least the outlet being positioned within the annular conduit upstream the gas outlet.

2. A feed nozzle assembly according to claim 1 wherein the third tube is parallel to the inner tube.

3. A feed nozzle assembly according to claim 1 wherein the third tube is connected to a tube bend crossing the wall of the outer tube.

4. A feed nozzle assembly according to claim 1 wherein the third tube is part of an array of parallel tubes in the annular conduit.

5. A feed nozzle assembly according to claim 1 wherein the inlet of the third tube is operatively connected to a supply of a hydrocarbon feed.

6. A feed nozzle assembly according to claim 1 wherein the inlet of the third tube is operatively connected to a supply of a fluid biomass containing feed.

7. A feed nozzle assembly according to claim 1 wherein the inlet of the third tube is operatively connected to a supply of sour water.

8. A feed nozzle assembly according to claim 1 wherein the inner tube is operatively connected to a supply of a dispersion gas, and wherein the outer tube is operatively connected to a supply of a liquid hydrocarbon fraction.

9. A feed nozzle assembly according to claim 1, wherein the third tube is operatively connected to a supply of a purging gas.

10. A catalytic cracking reactor comprising one or more feed nozzle assemblies according to claim 1.

11. A catalytic cracking reactor according to claim 10, wherein at least one of the feed nozzle assemblies is a side entry feed nozzle assembly.

* * * * *